United States Patent [19]

Hashimoto et al.

[11] Patent Number: 5,155,999
[45] Date of Patent: Oct. 20, 1992

[54] INTAKE SYSTEM FOR INTERNAL COMBUSTION ENGINE EQUIPPED WITH SUPERCHARGER

[75] Inventors: Hiroshi Hashimoto, Chigasaki; Suehiro Urabe, Fujisawa, both of Japan

[73] Assignee: Nissan Motor Co., Ltd., Yokohama, Japan

[21] Appl. No.: 697,338

[22] Filed: May 9, 1991

[30] Foreign Application Priority Data

May 18, 1990 [JP] Japan ................... 2-51859

[51] Int. Cl.⁵ ......................................... F02B 37/00
[52] U.S. Cl. ........................................... 60/611
[58] Field of Search ............... 123/564; 60/600, 601, 60/611

[56] References Cited

U.S. PATENT DOCUMENTS 1,955,799 4/1934 Fielden ........................... 123/564
4,539,948 9/1985 Toepel ........................ 123/564 X

FOREIGN PATENT DOCUMENTS 38622 2/1988 Japan ........................... 60/611
46628 3/1988 Japan ........................... 60/611
297741 12/1988 Japan ......................... 123/564
102323 4/1990 Japan ........................... 60/611

Primary Examiner—Michael Koczo
Attorney, Agent, or Firm—Foley & Lardner

[57] ABSTRACT

An intake system of a V-type internal combustion engine equipped with a turbocharger. The intake system is has an air intake passageway which is branched at a branched section into first and second downstream air intake passageways which are respectively communicable with first and second banks of the engine. First and second throttle valves are disposed respectively in the first and second downstream air intake passageways. Intake air is bypassed from the branched section through the air bypass passage to an upstream side of the turbocharger compressor when the throttle valves are closed in order to prevent an excessive pressure rise in an upstream side of the throttle valves. The air flow through the air bypass passage is controlled by an air bypass valve disposed in the air bypass passage near the branched section.

7 Claims, 5 Drawing Sheets

INTAKE SYSTEM FOR INTERNAL COMBUSTION ENGINE EQUIPPED WITH SUPERCHARGER

BACKGROUND OF THE INVENTION

1. Field of the Invention

This invention relates to improvements in an intake system for an internal combustion engine equipped with a supercharger, and more particularly to an air bypass device for bypassing or releasing intake air from the downstream side to the upstream side of the supercharger.

2. Description of the Prior Art

Automotive internal combustion engines equipped with a supercharger are usually provided with an air bypass device to bypass or recirculate intake air from the upstream side to the downstream side of the compressor of a supercharger. An example of such an air bypass device is disclosed in Japanese Utility Model Publication No. 63-46628 and shown in FIG. 1 of the drawings of the present application. In FIG. 1, the air bypass device includes an air bypass passage 2 through which intake air in the downstream side of a turbocharger 1 is bypassed to the upstream side of the turbocharger 1 in an initial period of deceleration of the engine. A recirculation or bypass valve 3 is disposed in the bypass passage 2 and adapted to be opened by the pressure differential between a first pressure chamber 6 in communication with the upstream side of a throttle valve 5 and a second pressure chamber 7 in communication with the downstream side of the throttle valve 5. The bypass valve 3 is connected to and movable with a diaphragm which defines the first and second pressure chambers 6, 7 on the opposite sides thereof. Upon opening of the bypass valve 3, the pressure prevailing in the downstream side of the turbocharger compressor is prevented from an excessive rise due to closure of the throttle valve at a sudden deceleration of the engine.

The above discussed conventional air bypass device as shown in FIG. 1 is for the internal combustion engine which is provided with only one air intake passageway which is communicable with all of the engine cylinders. However, difficulties have been encountered in the case where such a conventional air bypass device is applied to a V-type internal combustion engine in which two independent air intake passageways are provided respectively for the left and right side banks of the engine. In such an engine, an upstream side air intake passageway is branched into the two downstream air intake passageways at a position downstream of the turbocharger, in which two throttle valves are respectively disposed in the downstream air intake passageways. In this arrangement, the air bypass device includes an air bypass passage through which intake air is recirculated back from the downstream side to the upstream side of the turbocharger. The air bypass passage is provided with an air bypass valve for controlling air flow in the air bypass passage.

The encountered difficulties will be discussed: If the air bypass valve is disposed one-sided to one of the two downstream air intake passageways, distribution of intake air to the two air intake air passageways becomes unequal under the action of bypass air flow in the upstream side of the throttle valves during a transition period from a sudden deceleration to a re-acceleration. This phenomena is common in low and medium engine speed ranges.

In order to improve such unequal distribution of intake air, it may be considered to dispose the air inlet of the air bypass passage at an upstream position far from an air intake passageway branched section from which the air intake air passageway is branched off. However, this unavoidably prolongs the distance of the air inlet from the throttle valves, and therefore intake air cannot be smoothly inducted into engine cylinders during the transition period from the sudden deceleration situation to the re-acceleration situation, thereby deteriorating response in acceleration and deceleration. Additionally, in a usual arrangement in which control of the air bypass valve is made in accordance with intake vacuum prevailing in the downstream side of the throttle valves, the length of a vacuum line through which intake vacuum for controlling the air bypass valve is supplied is enlarged, thereby degrading the controllability of the air bypass valve.

Furthermore, it may be considered that each of the two air intake passageways is provided with the air inlet of the air bypass passage and the air bypass valve. However, this unavoidably increases the number of parts required, such as pipings, and thereby increases production costs and degrades assembly operation.

SUMMARY OF THE INVENTION

It is an object of the present invention to provide an improved intake system for an internal combustion engine equipped with a supercharger, by which intake air can be equally inducted into first and second groups of engine cylinders without increasing the number of parts such as pipings.

Another object of the present invention is to provide an improved intake system for an internal combustion engine equipped with a supercharger such that an equal amount of intake air is introduced into each of first and second air intake passageways, which are connected with first and second groups of engine cylinders, even during a transition period from a sudden deceleration situation to a re-acceleration situation or even during acceleration and deceleration in a low or medium engine speed range.

A further object of the present invention is to provide an improved intake system for an internal combustion engine equipped with a supercharger, by which the distance of the air inlet of an air bypass passage from a throttle valve is equal in first and second air intake passageways which are branched off from a single air intake passageway.

An intake system according to the present invention is for an internal combustion engine equipped with a supercharger. The intake system is comprised of an air intake passageway through which intake air flows. The air intake passageway includes first and second downstream air intake passageways which are branched off at a branched section from an upstream air intake passageway connected to a compressor of the supercharger. The upstream air intake passageway forms part of the air intake passageway. The first and second downstream air intake passageways are communicable with first and second groups of engine cylinders, respectively. First and second throttle valves are respectively disposed in the first and second downstream air intake passageways. An air bypass passage is provided so that intake air is bypassed from the air intake passageway downstream of the supercharger compressor to the intake air passageway upstream of the supercharger compressor. The air bypass passage has a first end (air inlet)

opened to the air intake passageway at a location near the branched section. Additionally, an air bypass valve is provided to control air flow through the air bypass passage in accordance with an engine operating condition.

Accordingly, with the intake system of the present invention, an equal distribution of intake air is provided to the first and second downstream air intake passageways even during a transition period from a deceleration situation to a reacceleration situation thereby, obtaining a high response in acceleration and deceleration of the engine. This effectively brings out a high intake air inertial effect due to the two downstream air intake passageways and suppresses surging of the supercharger during a sudden deceleration, thereby lowering intake air noise and prolonging the life of the supercharger.

DETAILED DESCRIPTION OF THE INVENTION

Figure 1:
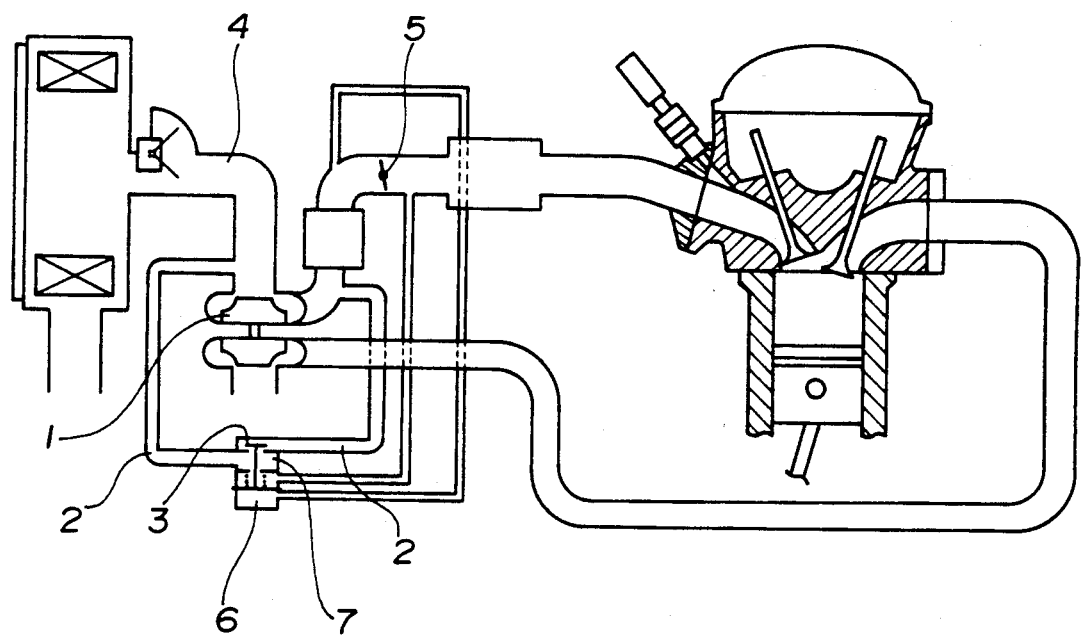
FIG. 1 is a diagrammatic view, partly in section, of an internal combustion engine provided with a conventional intake system.
Figure 2:
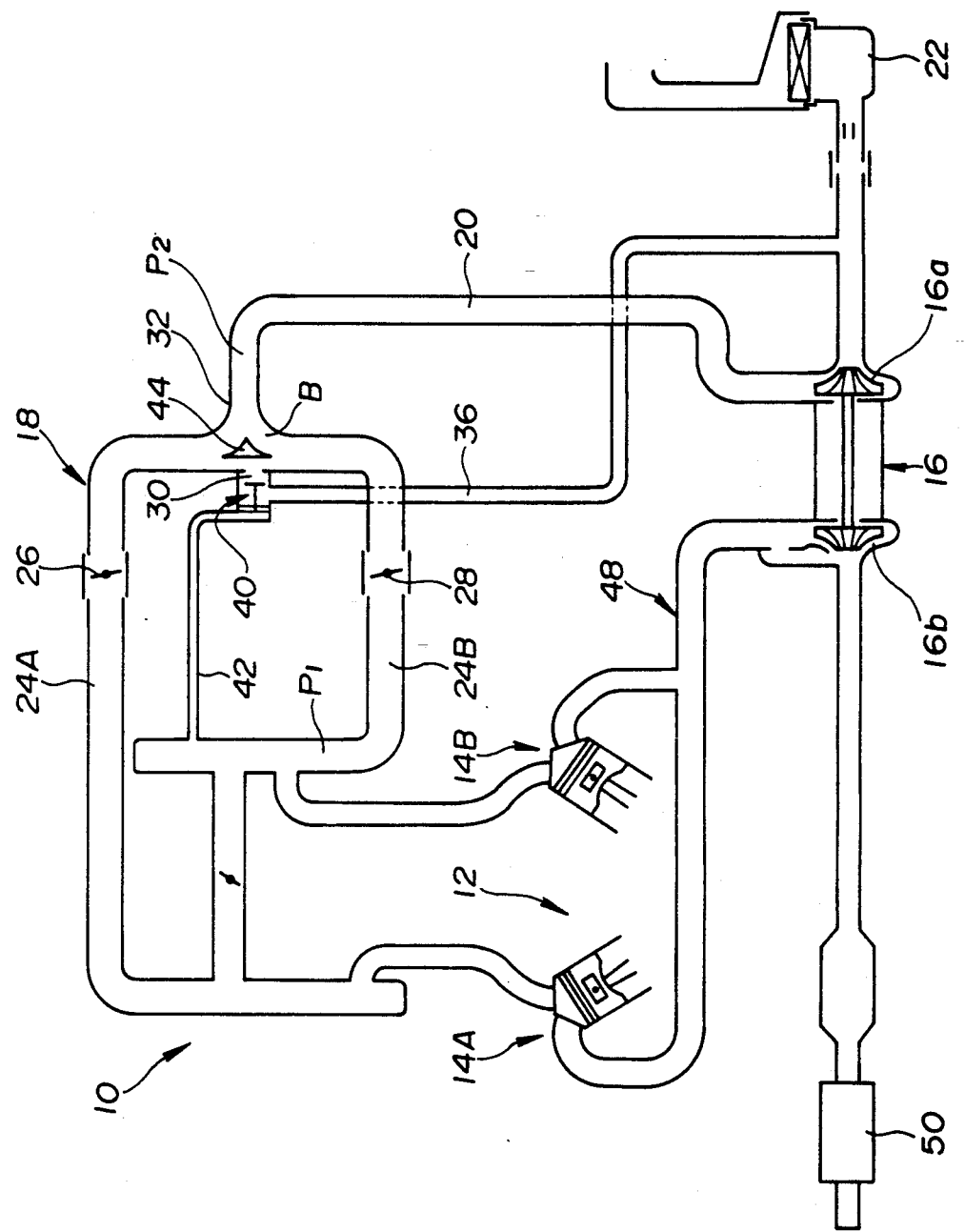
FIG. 2 is a diagrammatic view of an embodiment of an intake system for an internal combustion engine equipped with a turbocharger, in accordance with the present invention.

Referring now to FIGS. 2 to 5, and more specifically to FIG. 2, an embodiment of an intake system for an internal combustion engine 12 according to the present invention is illustrated by the reference numeral 10. In this embodiment, the engine 12 is formed with first and second banks 14A, 14B which are arranged V-shaped. The first and second banks 14A, 14B are formed with first and second groups of engine cylinders (not identified), respectively. The engine 12 is mounted on an automotive vehicle though not shown. The engine 12 is equipped with a turbocharger 16 having a compressor 16a and a turbine 16b.

The engine 12 is provided with an intake air passageway 18 including an upstream air intake passageway 20 connected to an air filter 22. The compressor 16a of the turbocharger 16 is disposed in the upstream air intake passageway 20. The upstream air intake passageway 20 is branched at its downstream end section or branched section B into first and second downstream air intake passageways 24A, 24B which are respectively connected to the first and second banks 14A, 14B. In other words, the first and second downstream air intake passageways 24A, 24b are communicable with the first and second groups of the engine cylinders, respectively, so that intake air flowing through the downstream air intake passageways 24A, 24B are inducted into the engine cylinders. The downstream air intake passageways 24A, 24B are supplied with intake air through the upstream air intake passageway 20 and the air filter 22. First and second throttle valves 26, 28 are rotatably disposed in the first and second upstream air intake passageways 24A, 24B, respectively. The throttle valves 26, 28 are operated through an accelerator (not shown) by a driver or operator thereby controlling the air flow amount in the downstream air intake passageways 24A, 24B.

Figure 3:
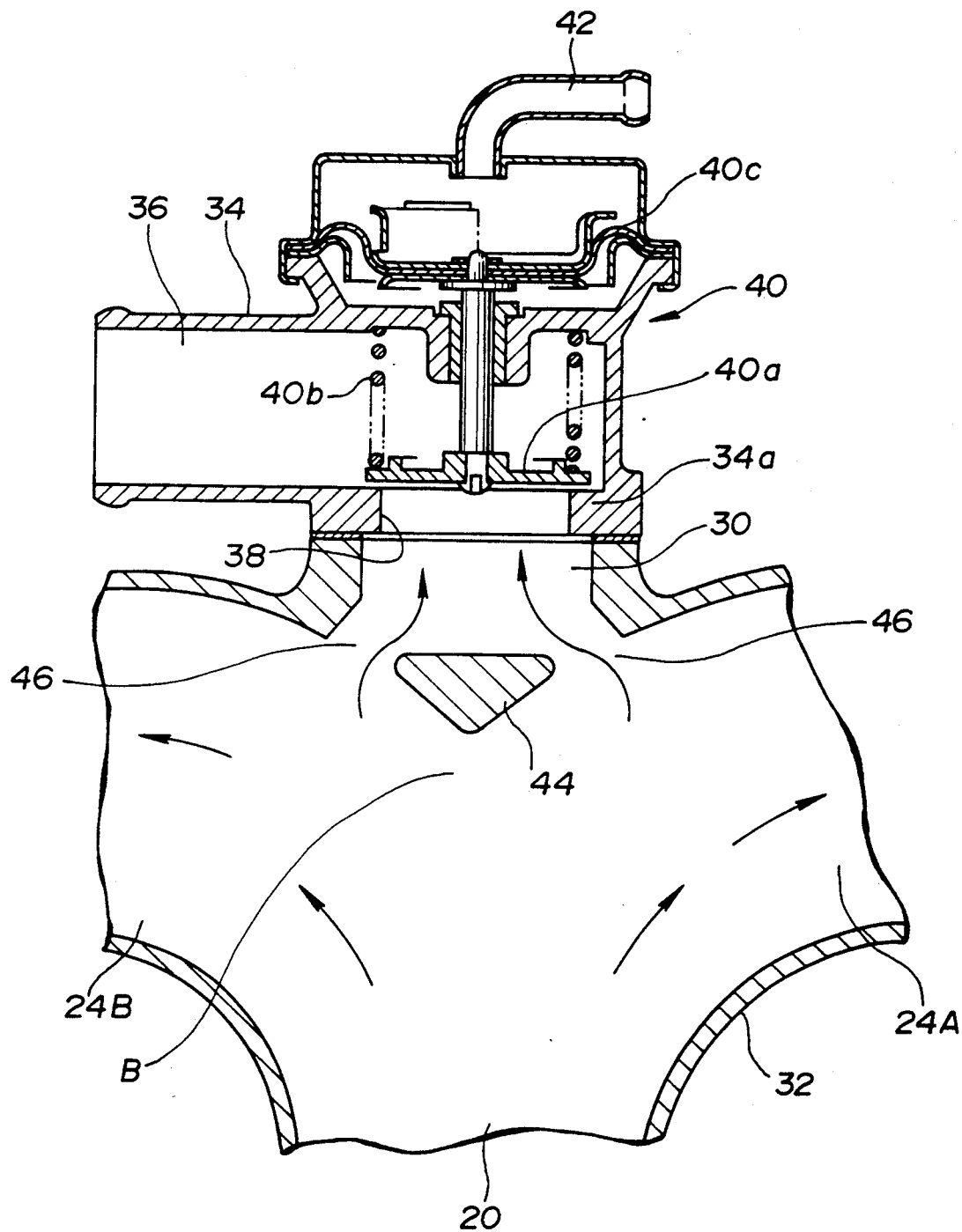
FIG. 3 is a fragmentary vertical sectional view showing an air bypass valve forming part of the intake system of FIG. 2 and a structure around the air bypass valve.
Figure 4:
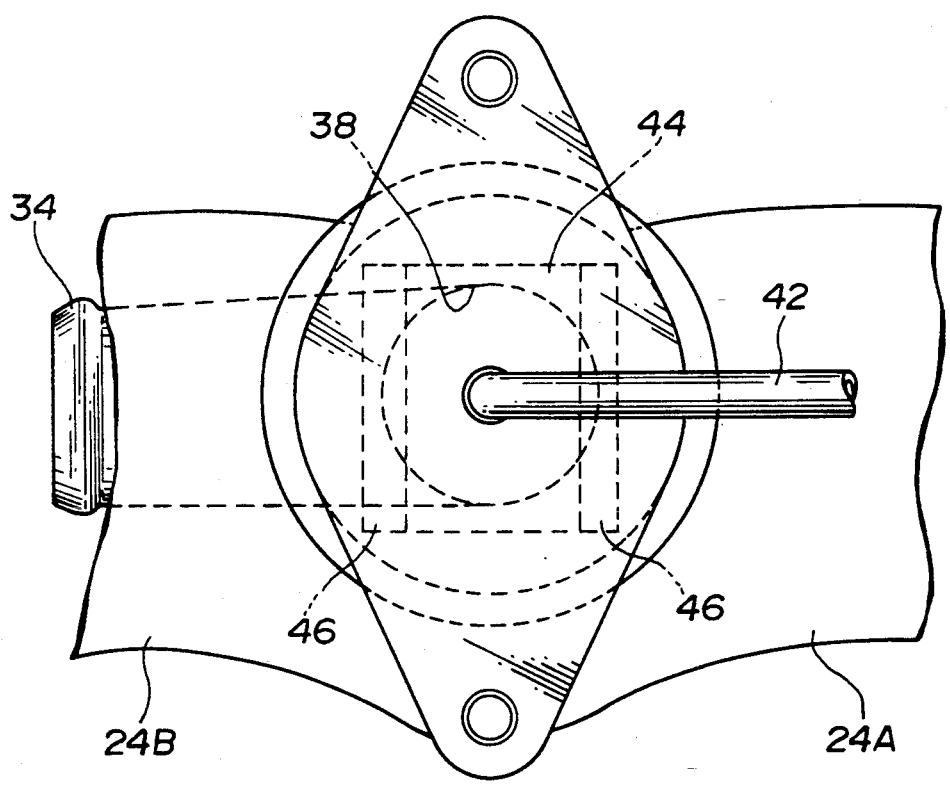
FIG. 4 is a plan view of the air bypass valve of FIG. 3.

As clearly shown in FIG. 3, the air intake passageway 18 has a bypass opening 30 through which intake air flowing through the upstream air intake passageway 20 can flow to be bypassed. The bypass opening 30 is defined by a generally cylindrical section 32a of an air intake pipe 32, which cylindrical section is located near the branched section B of the air intake passageway 18. An air bypass pipe 34 defining therein an air bypass passage 36 is provided to connect the air intake pipe 32 near the branched section B and the air intake pipe 32 upstream of the compressor 16a of the turbocharger 16. More specifically, an end section of the air bypass pipe 34 is tightly connected with the cylindrical section 32a of the air intake pipe 32 and formed with an annular valve seat 34a defining thereinside a bypass air intake port 38 through which intake air from the upstream air intake passageway 20 is flowable into the air bypass passage 36. It will be understood that the bypass opening 30 and the bypass air intake port 38 may form part of the air bypass passage 36. Thus, the bypass opening 30 and/or the bypass air intake port 38 serves as an "air inlet" of the air bypass passage 36. As shown, the air inlet is opened and located at or near the branched section B of the air intake passageway 18. It is to be noted that the terms "at or near" may be represented by the term "near" in this case.

An air bypass or recirculation valve 40 is mounted on the bypass pipe 34 and disposed near the bypass air intake port 38. The bypass valve 40 includes a valve member 40a biased onto the valve seat 34a under the bias of a spring 40b and connected to a diaphragm 40c. The diaphragm 40c defines a chamber 50 which is communicated through a recirculation control pipe 42 with the air intake passageway 18 downstream of the throttle valves 26, 28, so that the chamber is supplied with a pressure $P_1$ prevailing in the air intake passageway 18 downstream of the throttle valves 26, 28. The diaphragm 40c receives, on its surface opposite to the chamber 50, a pressure $P_2$, prevailing in the air intake passageway 18 upstream of the throttle valves 26, 28. Accordingly, the valve member 40a can separate from the valve seat 34a to put the bypass valve 40 into an opened state under a pressure differential between the pressures $P_1$ and $P_2$ during a condition in which the throttle valves 26, 28 are closed, thereby releasing the pressure in the air intake passage 18 upstream of the throttle valves 26, 28 through the bypass passage 36. Thus, intake air pressurized by the turbocharger compressor 16a is recirculated or fed back to the upstream air intake passage 20 upstream of the compressor 16a.

Figure 5:
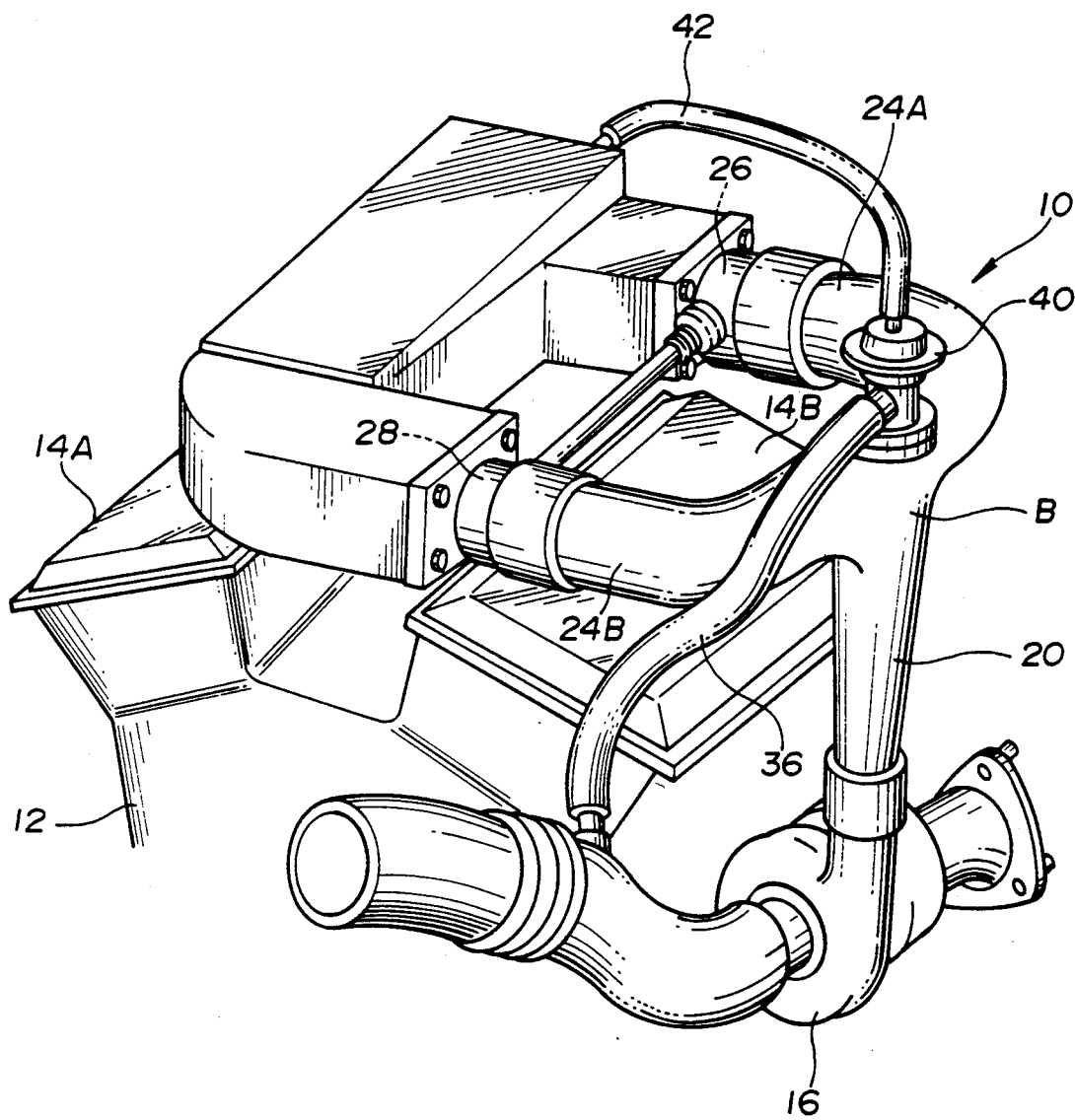
FIG. 5 is a perspective view of the intake system of FIG. 2.

As seen in FIG. 5, the bypass valve 40 is located right above the turbocharger 16 and positioned relatively near the throttle valves 26, 28 in such a manner that the throttle valves 26, 28 are equidistant from the air inlet of the bypass passage 36 and from the bypass valve 40. The branched section B of the air intake passage 18 is connected with the turbocharger 16a through a part of the upstream air intake passage 20 extending generally vertically.

Turning back to FIG. 3, in the air intake passageway branched section B, a separated wall portion or baffle plate 44 is integral with the air intake pipe 32 and is located in front of the bypass air intake port 38 in a direction of flow of intake air to be bypassed from the air intake passageway 18 to the bypass passage 36. The wall portion 44 is positioned near and slightly upstream of the cylindrical section 32a to define air introduction passages 46 between both its sides and the inner wall of the air intake pipe 32. Intake air flows through these air introduction passages 46 toward the air bypass passage 36.

The engine cylinders in the first and second banks 14A, 14B are connected through an exhaust gas passageway 48 to a muffler 50. The turbine 16b of the turbocharger 16 is disposed in the exhaust gas passageway 48, so that exhaust gases from the engine cylinders are passed through the turbine 16b and discharged out through the muffler 50.

With the above-discussed intake system 10, when the throttle valves 26, 28 are closed to slow down engine speed and power output of the engine 12, the air bypass valve 40 is opened under the pressure differential between the pressures $P_1$ and $P_2$ on the respective downstream and upstream sides of the throttle valve 26, 28. Then, intake air flowing through the air intake passage branched section B is introduced through the air bypass valve 40 into the air bypass passage 36 and recirculated into the upstream air intake passageway 20 upstream of the compressor 16a of the turbocharger 16.

Here, the air bypass valve 40 is located near the branched section B of the air intake passageway 18 and therefore positioned relative to the throttle valves 26, 28 in a such a manner that the throttle valves 26, 28 are generally equidistant from the bypass valve 40. As a result, both the upstream air intake passageways 24A, 24B are equally affected by bypass air flow recirculated through the bypass passage 36, so that the same amount of air is inducted into the first and second downstream air intake passageways 24A, 24B during a re-acceleration which occurs immediately after a rapid deceleration, or during an acceleration in a low or medium engine speed range. Additionally, the air bypass valve 40 is located relatively near the throttle valves 26, 28, and therefore response of the air bypass valve 40 is high and thereby prevents the driver from receiving an uncomfortable ride.

The air bypass valve 40 is located right above the turbocharger 16 as clearly shown in FIG. 3. In other words, the air bypass valve 40 is located in a direction to receive an air pressure from the turbocharger compressor 16a. The valve member 40a of the air bypass valve 40 is biased by the spring 40b in a direction opposite to that of application of the air pressure from the turbocharger compressor 16a. With this structure, when the turbocharger 16 is suddenly raised in rotational speed or engine brake is applied during a sudden acceleration or deceleration, dynamic pressure due to an air pressure change directly strikes the valve member 40a of the air bypass valve 40. Hence, it may seem that there is a possibility that the air bypass valve 40 would be prone to chattering. However, according to this embodiment, the wall portion 44 is disposed in front of the valve member 40a relative to the direction in which the dynamic pressure from the turbocharger 16 is applied. Accordingly, the dynamic pressure is prevented from directly striking the valve member 40a of the air bypass valve 40, thereby avoiding chattering of the air bypass valve 40. Additionally, this can prevent generation of chattering of the air bypass valve 40 due to an air column resonance in the intake system, such resonance being generated by intake air pulsation in the engine.

The wall portion 44 interrupts a resonance system thereby preventing chattering in the intake system.

What is claimed is:

1. An intake system for an internal combustion engine equipped with a supercharger, comprising:
   means defining an air intake passageway through which intake air flows, said air intake passageway including first and second downstream air intake passageways which are branched off at a branched section from an upstream air intake passageway connected to a compressor of the supercharger, said upstream air intake passageway forming part of said air intake passageway, said first and second downstream air intake passageways being communicable with first and second groups of engine cylinders, respectively;
   first and second throttle valves respectively disposed in said first and second downstream air intake passageways;
   means defining an air bypass passage through which intake air is bypassed from said air intake passageway downstream of said supercharger compressor to said air intake passageway upstream of said supercharger compressor, said air bypass passage having an air inlet opened to the air intake passageway at or near said branched section; and
   an air bypass valve for controlling air flow through said bypass passage in accordance with an engine operating condition.

2. An intake system as claimed in claim 1, wherein said air bypass valve is disposed in said air bypass passage and located near said branched section in said air intake passageway.

3. An intake system as claimed in claim 2, wherein said air bypass valve is adapted to control the air flow through said air bypass passage in accordance with intake vacuum prevailing in said air intake passageway downstream of said throttle valves.

4. An intake system as claimed in claim 1, wherein said first and second throttle valves are located equidistant from said branched section along the length of said air intake passage.

5. An intake system as claimed in claim 3, wherein said air bypass valve has a valve member movably disposed near and downstream of the air inlet of said air bypass passage.

6. An intake system as claimed in claim 1, further comprising a baffle plate fixedly disposed in said branched section and located proximately in front of the air inlet of said air bypass passage in a direction of air flow from said air intake passageway to said air bypass passage.

7. An internal combustion engine, comprising:
   first and second banks which are independent from each other and respectively have first and second groups of engine cylinders;
   a turbocharger having a compressor;
   means defining an air intake passageway though which intake air is supplied from said turbocharger compressor to the engine cylinders, said air intake passageway including
   an upstream air intake passageway connected with said turbocharger compressor;
   first and second downstream air intake passageways which are branched off at a branched section from said upstream air intake passageway, said first and second downstream air intake passageways being respectively communicable with said first and second groups of engine cylinders;

first and second throttle valves respectively disposed in said first and second downstream air intake passageways;

means defining an air bypass passage through which intake air is bypassed from said air intake passageway downstream of said turbocharger compressor to said air intake passageway upstream of said turbocharger compressor, said air bypass passage having an air inlet opened to said air intake passageway proximate to said branched section; and an air bypass valve for controlling air flow through said bypass passage in accordance with an engine operating condition, said air bypass valve being disposed in said air bypass passage near said branched section.

* * * * *